May 12, 1925.
H. C. SCHLICKER
MOVING PICTURE FILM CONTAINER
Filed Nov. 8, 1919
1,537,196
2 Sheets-Sheet 1
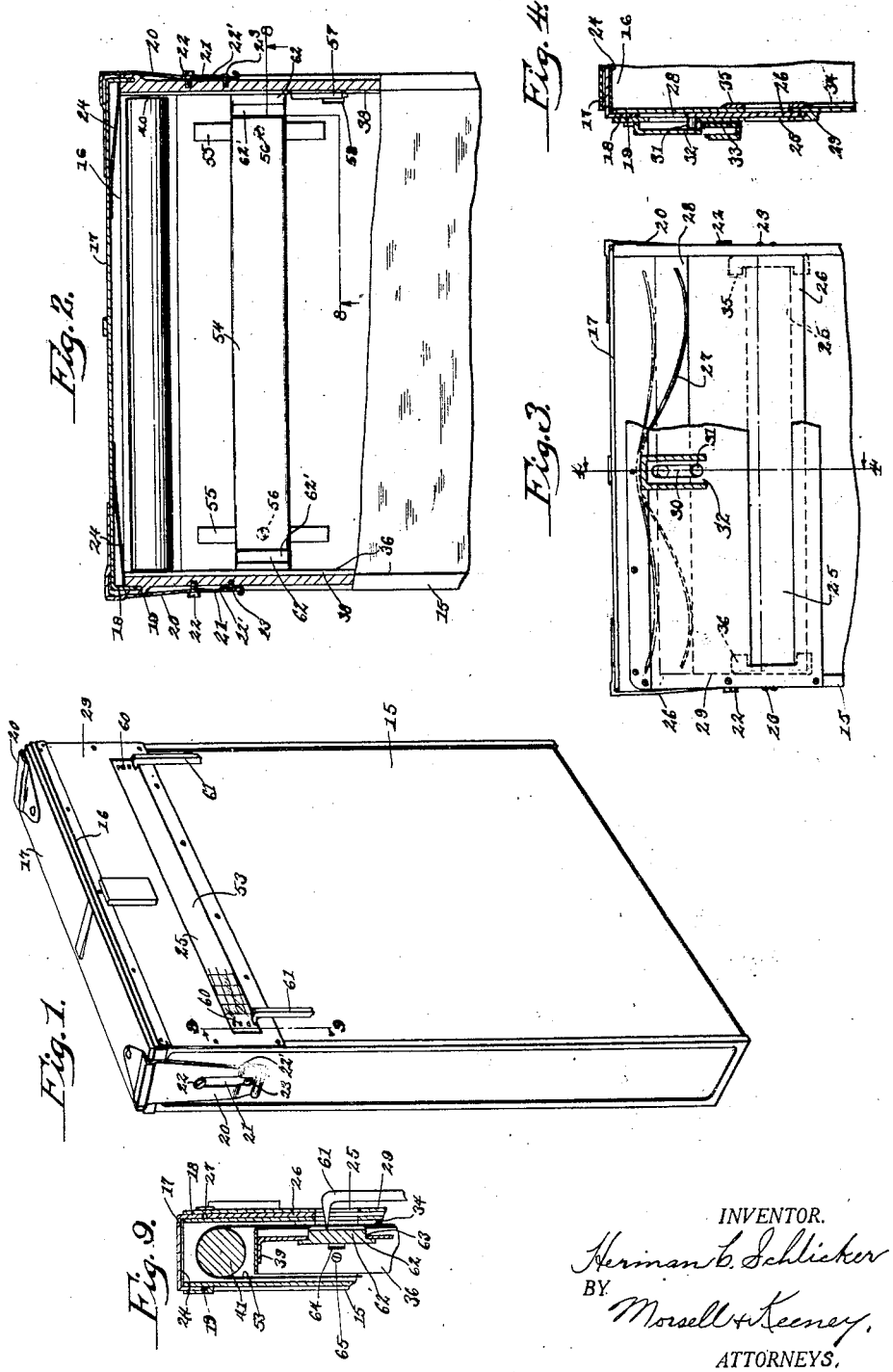

May 12, 1925. 1,537,196
H. C. SCHLICKER
MOVING PICTURE FILM CONTAINER
Filed Nov. 8, 1919 2 Sheets-Sheet 2
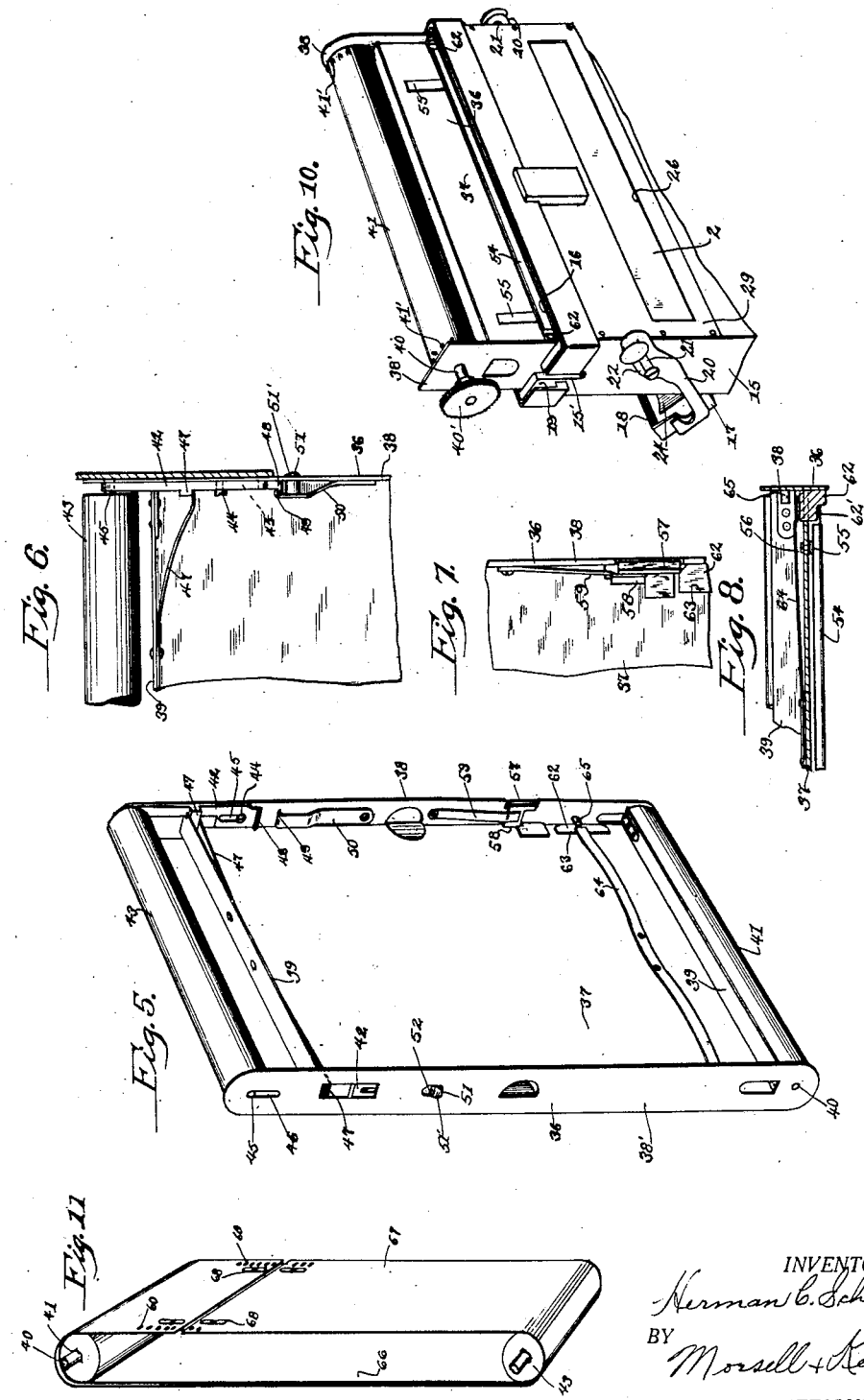
INVENTOR.
Herman C. Schlicker.
BY Morsell + Keeney
ATTORNEYS.

Patented May 12, 1925.

1,537,196

UNITED STATES PATENT OFFICE.

HERMAN C. SCHLICKER, OF MILWAUKEE, WISCONSIN, ASSIGNOR OF ONE-HALF TO JOHN R. FREULER, OF MILWAUKEE, WISCONSIN.

MOVING-PICTURE-FILM CONTAINER.

Application filed November 8, 1919. Serial No. 336,703.

*To all whom it may concern:*

Be it known that I, HERMAN C. SCHLICKER, a citizen of the United States and resident of Milwaukee, in the county of Milwaukee and State of Wisconsin, have invented new and useful Improvements in Moving-Picture-Film Containers, of which the following is a description, reference being had to the accompanying drawings, which are a part of this specification.

This invention relates to improvements in moving picture film containers for use in moving picture cameras.

It is one of the objects of the present invention to provide a moving picture film container which is of comparatively small size, light weight and inexpensive to manufacture and is well adapted for amateur or home use.

A further object of the invention is to provide a moving picture film container in which the film is entirely enclosed by the container and may be easily inserted in or removed from the camera without the necessity of entering a dark room.

A further object of the invention is to provide a moving picture film container which when inserted in the container remains in a fixed position therein.

A further object of the invention is to provide a moving picture film container more particularly adapted for holding integral endless films, or films which have their end portions joined together or in some manner held to form an endless band.

A further object of the invention is to provide a moving picture film container constructed to permit the film to be entirely exposed without any portion being removed from the container.

A further object of the invention is to provide a moving picture film container constructed to permit the film to be intermittently rotated to successively expose portions of the film through an opening provided in the container.

A further object of the invention is to provide a moving picture film container in which the film while of the band type is adapted to have each portion exposed maintained in a flat plane during the exposure.

A further object of the invention is to provide a moving picture film container which may be freely handled outside of the dark room without the liability of the container being accidentally opened and the film therein fogged or otherwise spoiled.

A further object of the invention is to provide a moving picture film container adapted to hold a film in the form of a sheet mounted upon an endless belt.

A further object of the invention is to provide a moving picture film container having an exposure opening which is normally closed and cannot be opened until the container is inserted within the camera in which it is adapted for use.

A further object of the invention is to provide a moving picture film container having an exposure opening normally closed and which may be automatically opened by inserting the container within the camera.

A further object of the invention is to provide a moving picture film holder which is of simple construction, is strong and durable and is well adapted for the purpose described.

With the above and other objects in view the invention consists of the improved moving picture film container and its parts and combinations as set forth in the claims, and all equivalents thereof.

In the accompanying drawings in which the same reference characters indicate the some parts in all of the views:

Fig. 1 is a perspective view of the improved moving picture film container, the view also showing portions of the means for intermittently rotating the film;

Fig. 2 is a front view of the upper portion thereof, parts being shown in section;

Fig. 3 is a similar view with parts broken away;

Fig. 4 is a sectional detail view taken on line 4—4 of Fig. 3;

Fig. 5 is an inverted perspective view of the film holder portion removed from the casing;

Fig. 6 is a sectional detail view on a larger scale of one corner portion of the film holder portion;

Fig. 7 is a detail view of a medial part of the film holder portion;

Fig. 8 is a sectional detail view of the holder portion taken on line 8—8 of Fig. 2;

Fig. 9 is a sectional detail view of the container taken on a larger scale on line 9—9 of Fig. 1;

Fig. 10 is a perspective view of the upper portion of a modified form of film container, the cover being shown in open position and the film holder partly withdrawn; and Fig. 11 is a perspective view of a modified form of film and endless belt holder, the supporting frame being removed.

Referring to the drawings the numeral 15 indicates the casing of the container which is of rectangular form and is provided with an upper open end 16 closed by a swingable and slidable cover 17. The said cover is formed with a lower rectangular flange 18 which fits snugly into a rectangular groove 19 provided in the upper edge of the casing to form a light proof connection between the casing and the cover. The cover is also provided with end spring arms 20 having elongated slots 21 in their lower ends through which screws 22 extend and are threaded into the casing. Said arms have slight offset portions 22' adjacent their lower ends and said lower ends are adapted to snap over locking pins or projections 23 when the cover is in closed position. When in closed position the slotted portions 21 extend downwardly from the screws 22 to permit the cover flange to disengage the rectangular end groove so that the cover can be swung laterally. Flat springs 24 positioned within the upper portion of the cover and fastened thereto bear against the upper end edge of the casing and hold the arm yieldingly in engagement with the locking pins or projections 23 so that by pressing downwardly the arms may be easily released from the pins or projections.

The upper front portion of the casing is formed with an elongated side opening 25 for exposing the film within the casing therethrough. A slidable door or shutter 26 closes the side opening 25 and is yieldingly held in its closed position by a curved flat spring 27 which is positioned in the slideway 28 formed by the double wall portion 29 of the casing and bears against the upper edge of the shutter. The double wall portion 29 is formed with an elongated slot 30 and a short pin 31 connected to the shutter projects therethrough and into a covering hood 32 to prevent the passage of light through the slot and also protect the sliding door from being opened accidentally. The bottom portion of the hood is open so that when the casing is inserted into the camera a projecting portion 33 of the camera may engage the pin 31 and automatically move the shutter to open position. If desired the projecting portion 33 may be omitted and the shutter be manually moved to open position.

Within the casing the opposite side portions or walls are covered with velvet or other soft material 34 to prevent the film from being scratched or marred by rubbing against the said walls.

The inner portion of the casing at opposite ends of the elongated side opening 25 is provided with bearing strips 35 against which the side edge portions of the film bear and slide to prevent medial portions of the film contacting with the side walls.

A film holder 36 removably positioned within the casing comprises a rectangular body or frame 37 having opposite side edge flange portions 38 and 38' which extend on opposite sides of the body, and also having end flanges 39 which extend only on one side of the body. The side flanges 38 and 38' at the upper end of the holder extend above the body portion and have journaled therein the shaft 40 of a film holding roller 41. The opposite or lower ends of the side flanges 39 also extend beyond the end of the body portion to receive therebetween the slidable bearings 42 of the lower film roller 43. The bearings 42 are slidably guided on the holder 36 by screws 44 which extend through slots 45 formed in the bearings and are threaded into the side flanges 38 and 38' and also by the film roller shaft 45 which is journaled in the bearings and extends through elongated slots 46 formed in the lower projecting end portions of the side flanges 38 and 38'.

A curved spring 47 medially connected to the lower end flange 39 has its opposite end portions engaging shouldered or slotted portions 47 of the bearings 42 and normally yieldingly hold said bearings and the roller journaled therein in their outer position. The inner end portions of the bearings 42 are rounded and formed with locking shoulders 48 which are engaged by the upper free ends of hook portions 49 of lock springs 50 which are fastened at their lower ends to the side flanges 38 and 38'. Buttons 51 fastened to the lock springs and projecting outwardly through openings 52 in the side flanges 38 and 38' have outer angular or beveled ends 51' which engage the opposite edge walls of the container when the holder is inserted into the container. This engagement will force the buttons and the springs inwardly and automatically release the bearings 42 and said bearings will be forced outwardly and exert a yielding tension on an endless film 53 mounted on the rollers 41 and 43. This automatic release may be eliminated if desired and the slidable bearings be manually released after the holder has been inserted in the container.

In order to firmly and yieldingly hold in position the portion of the film to be exposed through the opening 25, the body portion 37 is provided with a pad member 54 which bears against the rear portion of the film 53 in register with the container opening 25. Said pad member is yieldingly pressed against film back by light springs 55 which are fastened to the back portion of the pad member and bear at their opposite ends against the body portion 37. Screws 56 threaded into the rear portion of the pad member and extending loosely through the body portion 37 limit the outward movement of the pad member.

It is also necessary to have the film travel in a fixed path edgewise and in order to accomplish this result an edge guide member 57 is provided which extends through an opening 58 in the side edge portion of the body 37. This guide member 57 is connected to the free end of a spring 59 mounted on the body flange 38 and causes the guide member 57 to lightly press against one edge of the film on opposite sides of the body portion and press the opposite edge of the film against the flange 38' on the opposite edge of the body. Said opposite flange 38' is of greater length and for the greater portion of its length is of greater width than the flange 38 to form a support for the edge of the film pressed thereagainst. The less length and width of the flange 38 permits the endless film to be easily slipped over said flange 38 and in position on the rollers when the roller 43 is in its innermost position.

The film adapted for use in this container is preferably provided with a line of perforations 60 on its opposite edge portions which are preferably engaged by feed hook members 61 and the film intermittently moved thereby. Said feed hook members form part of the camera with which the container is adapted for use and they may be reciprocated in any manner desired and not necessary to describe.

The opposite ends of the pad member terminate a short distance from the side flanges 38 and in the spaces between the said ends and the flanges are positioned, yielding members or blocks 62 which bear against the inner side of the film along the lines of perforations. Portions of the blocks are offset inwardly as indicated by the numeral 62' to permit the hooked ends of the hook members to extend a slight distance through the perforations of the film. The blocks 62 extend through openings 63 in the body portion 37 and are guided by the edges of the body and the side flanges 38 forming the said openings. A spring 64 medially connected to the rear part of the body portion and having its opposite ends bearing against the rear sides of the blocks holds said blocks yieldingly against the film back, and pins 65 in the path of movement of the ends of the spring and the block limit the rearward movement of the spring and the blocks.

In the modified form shown in Fig. 10 the hook members 61 are omitted and the film roller 41 at its opposite ends is provided with teeth 41' which enter the perforations 60 of the film to intermittently rotate the same, and the shaft 40 of the roller is of greater length and is provided with a gear wheel 40' for engagement with actuating mechanism of the camera with which it is used. The container 15 has a cut out portion 15' to permit the shaft 40 to project therethrough.

The modified form of Fig. 11 shows an endless belt 66 mounted on the rollers 41 and 43 and a strip film 67 extending therearound and having its opposite ends positioned adjacent each other and fastened to the endless belt by T-shaped paper staples 68 or any other desirable means.

In use the roller 43 is pressed inwardly to its innermost locked position and which position will permit the endless film or the belt with the film thereon to be easily slid edgewise onto the rollers forming part of the holder. When thus positioned the holder is slipped into the container and as the projecting buttons 51 engage the inner surface of edge walls of the container they will be pushed inwardly and release the lock springs 50 from engagement with the slidable bearings 42 and said bearings will be moved outwardly by the spring 47 and take up the slack in the film and hold said film yieldingly in taut position on the rollers. The top or cover 18 is now swung over the open end and pressed inwardly to tight and locked position. The loading of the container as just described must necessarily be done in a dark room in order not to fog the film but as soon as the container is loaded it may be carried outdoors with the camera without liability of inadvertent exposure of the film. When it is desired to expose the film the container is inserted in the camera in which it is adapted for use and when inserted the finger 33 forming part of the camera will engage and automatically open the shutter 26 or said shutter may be manually opened as desired. When thus positioned, the camera may be operated to expose in consecutive order spirally trending portions of the film by slowly moving the lens of the cameras transversely of the container from one end of the side exposure opening 25 to the other while the film within the container is being intermittently revolved or the lens may be fixed and the complete container be moved edgewise. The parts are so correlated and actuated that when the lens has reached the opposite end of the exposure opening the film will have revolved a sufficient number of times to expose the entire surface of the film through the lens resulting in a spirally trending line of pictures extending around the film from one side edge of the film to the other. In withdrawing the container from the camera the shutter will automatically close or the shutter may be manually closed before withdrawal.

The user may carry as many of the loaded film containers as desired and load and unload the camera in the open in the same manner as the ordinary film roll hand cameras.

From the foregoing description it will be seen that the moving picture film container is of very simple construction and well adapted for the purpose described.

What I claim as my invention is:

1. A moving picture film container, comprising a casing having a filling opening and an elongated side exposure opening, said exposure opening being in the side portion of the casing of greatest width, means for automatically closing said exposure opening, and removable means for holding a film in endless formation within the casing and permitting it to be rotated in a direction transversely to and in register with the exposure opening to expose portions thereof while extending in straight lines between opposite end portions of the casing in consecutive order through said exposure opening.

2. A moving picture film container, comprising a casing having a side exposure opening in the side portion of the casing of greatest width, means for automatically closing said opening, and a removable rotatable endless film holder within the casing and movable to expose through the opening the portions of the film mounted on the holder while extending in straight lines between opposite end portions of the holder.

3. A moving picture film container, comprising a casing having a side exposure opening in the side portion of the casing of greatest width, means for automatically closing said opening, and a removable rotatable endless film holder within the casing and movable to expose portions of the film through the opening, the portions of the film exposed being maintained in a straight line between the opposite end portions of the holder during the exposure.

4. A moving picture film container, comprising a casing having a side exposure opening in the side portion of the casing of greatest width, means for automatically closing said opening, a removable film holder within the casing and having opposite end rounded portions to receive a film in endless formation thereon, portions of the film between the rounded ends of the holder and adjacent the exposure opening being maintained in a straight line during exposure, said construction permitting the intermittent rotation of the film while within the container.

5. A moving picture film container, comprising a casing having an end opening and a side exposure opening, said exposure opening being in the side portion of the casing of greatest width, a shutter for automatically closing and opening said opening, a film holder frame within the casing and removable through the end opening, a roller mounted on one end portion of the frame, one end portion of the frame being longitudinally yieldable, and a rotatable film in endless formation extending around the frame and the roller, the portion of the film adjacent the exposure opening between the holder frame and the roller being maintained in a straight line during exposure.

6. A moving picture film container, comprising a casing having an end opening and a side exposure opening, said exposure opening being in the side portion of the casing of greatest width, a shutter for automatically closing and opening said opening, a film holder frame positioned within the casing and removable through the end opening, rollers mounted on the opposite end portions of the frame, one of said rollers being yieldingly mounted to move towards the other roller, and a film in endless formation extending around the frame and the rollers and held under tension by the rollers, the portion of the film between the rollers and adjacent the exposure opening being maintained in a straight line during the exposure.

7. A moving picture film container, comprising a casing having an end opening and a side exposure opening, said exposure opening being in the side portion of the casing of greatest width, a shutter yieldingly held in closed position for said side opening, and a film holder removably positioned within the casing for holding a film in endless formation and moving said film to expose side portions thereof in a plane while extending in a straight line through the side exposure opening when the shutter is open.

8. A moving picture film container, comprising a casing having an end opening and a side exposure opening, said exposure opening being in the portion of the casing of greatest width, a shutter for said exposure opening, a film holder frame positioned within the casing and removable endwise through the end opening, a roller mounted on one end of the frame, slidable bearing members mounted on the other end of the film holder frame, and a roller journaled in the slidable bearings, said frame and rollers adapted to hold a film in endless formation thereon and in a straight line plane between the rollers and adjacent the exposure opening.

9. A moving picture film container, comprising a casing having a side exposure opening, a shutter for said opening, a removable film holder frame positioned within the casing, rollers mounted on the opposite end portions of the frame, a film in endless formation mounted on the rollers and extending in planes therebetween, a yielding pad member mounted on the holder frame and bearing against the portion of the film immediately back of the exposure opening, said construction permitting the intermittent rotation of the portion of the film in register with the exposure opening.

10. A moving picture film container, comprising a casing having a side exposure opening, a shutter for said opening, a removable film holder frame positioned within the casing, rollers mounted on the opposite end portions of the frame, a film in endless formation mounted on the rollers and extending in planes therebetween, a yielding pad member mounted on the holder frame and bearing against the portion of the film immediately back of the exposure opening, yielding means engaging one edge portion of the film, said construction permitting the intermittent rotation of the portion of the film in register with the exposure opening.

11. A moving picture film container, comprising a casing having a side exposure opening, a shutter for said opening, a removable film holder frame positioned within the casing, rollers mounted on the opposite end portions of the frame, a film in endless formation mounted on the rollers and extending in planes therebetween, a yielding pad member mounted on the holder frame and bearing against the portion of the film immediately back of the exposure opening, yielding means engaging one edge portion of the film, other yielding means engaging the inner side of the film, said construction permitting the intermittent rotation of the portion of the film in register with the exposure opening.

12. A moving picture film container, comprising a casing having a side exposure opening, a shutter normally closing said opening, a removable film holder frame positioned within the casing, a roller mounted on one end of the frame, slidable bearings mounted on the other end of said frame, a roller journaled in said bearings, means yieldingly pressing the bearings outwardly, a film in endless formation mounted on the rollers and extending in a plane therebetween, a yielding pad member mounted on the holder frame and bearing against the portion of the film immediately back of the exposure opening, other yielding means engaging the film back adjacent the yielding pad, and means engaging one edge portion of the film, said construction permitting the intermittent rotation of the portion of the film in register with the exposure opening.

13. A moving picture film container, comprising a casing having a charging opening and an exposure opening, a cover for the charging opening, a shutter closing the exposure opening and yieldingly maintained in closed position, a removable film holder frame insertable into the casing through the charging opening, a roller mounted on one end of the frame, slidable bearings mounted on the opposite end of the frame and yielding inwardly, an inwardly film engaging yielding pad member mounted on the holder frame adjacent the exposure opening, other film engaging yielding members mounted on the holder frame adjacent the end portions of the pad member, and a yielding means mounted on the holding frame for engaging one edge portion of a film mounted on the rollers.

14. A moving picture film container, comprising a casing having a side exposure opening in the portion of the casing of greatest width, a film frame within the casing for holding a film in endless formation thereon and moving said film to expose flat portions thereof between its opposite ends of the film frame through the exposure opening, and means for exerting a yielding tension on said film when within the casing.

15. A moving picture film container, comprising a casing having an exposure opening closed by a shutter, a removable film frame within the casing for holding an endless film, one end portion of said frame being yieldable towards the other end portion, and means for holding said yieldable end in its inner position and releasable when the frame is inserted into the casing to exert a tension on the film.

16. A moving picture film container, comprising a casing having an end charging opening and a side exposure opening closed by a shutter, a cover for the end opening, a removable film holder frame insertable into the casing through the end opening, rollers mounted on both end portions of the holder frame, one of said rollers being yieldably movable towards the other and having an inner and an outer position of rest, and means for causing the roller to move to its outer position of rest when the holder is inserted in the casing.

17. A moving picture film container, comprising a casing having an end charging opening and a side exposure opening, a slidable shutter closing said exposure opening, a cover for the end opening, a removable film holder frame insertable into the casing through the end opening, a roller mounted on one end portion of the holder frame, a slidable bearing means mounted on the other end of said frame, a roller journaled in said bearing means, means yieldingly holding the slidable bearing means in its outer position, and means releasably holding the bearing means in its inner position.

18. A moving picture film container, comprising a casing having an end charging opening and a side exposure opening, a slidable shutter closing said exposure opening, a cover for the end opening, a removable film holder frame insertable into the casing through the end opening, a roller mounted on one end portion of the holder frame, slidable bearing members mounted on the opposite side portion of the other end of the frame, a roller journaled in the bearing members, spring means yieldingly holding the bearing members in their outer position, and means holding the bearing members in their inner position and actuated to release said bearing members when the holder frame is inserted in the casing.

19. A moving picture film container, comprising a casing having a charging opening and an exposure opening, a slidable shutter closing said exposure opening, a cover for the charging opening, a removable film holder frame insertable into the casing through the charging opening, a roller mounted on one end portion of the holder frame, a slidable bearing means mounted on the other end of said frame, a roller journaled in said bearing means, means yieldingly holding the slidable bearing means in its outer position, an endless film mounted on the rollers and rotatable to expose portions through the exposure opening, a pad member mounted on the frame and bearing against the film portion adjacent the exposure opening, and means releasably holding the bearing means in its inner position.

In testimony whereof I affix my signature.

HERMAN C. SCHLICKER.